US012640555B2

(12) United States Patent
Becker

(10) Patent No.: US 12,640,555 B2
(45) Date of Patent: May 26, 2026

(54) ELECTRIC DEVICE FOR A MOTOR VEHICLE

(71) Applicant: ZF FRIEDRICHSHAFEN AG, Friedrichshafen (DE)

(72) Inventor: Ingo Becker, Linnich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 155 days.

(21) Appl. No.: 18/681,727

(22) PCT Filed: Aug. 25, 2022

(86) PCT No.: PCT/EP2022/073693
§ 371 (c)(1),
(2) Date: Feb. 6, 2024

(87) PCT Pub. No.: WO2023/025897
PCT Pub. Date: Mar. 2, 2023

(65) Prior Publication Data
US 2024/0364102 A1     Oct. 31, 2024

(30) Foreign Application Priority Data
Aug. 27, 2021    (DE) .......................... 102021209436.8

(51) Int. Cl.
*H02H 7/00*          (2006.01)
*H02H 7/20*          (2006.01)
*B60R 16/03*         (2006.01)

(52) U.S. Cl.
CPC ............... *H02H 7/20* (2013.01); *B60R 16/03* (2013.01)

(58) Field of Classification Search
CPC ....................................................... H02H 7/20
See application file for complete search history.

(56) References Cited

U.S. PATENT DOCUMENTS

| | | | |
|---|---|---|---|
| 7,236,893 B2 * | 6/2007 | Gross ..................... | B60L 58/18 |
| | | | 702/57 |
| 9,413,170 B2 | 8/2016 | Henkel et al. | |
| 2005/0267697 A1 | 12/2005 | Gross et al. | |
| 2024/0364102 A1 * | 10/2024 | Becker ..................... | H02H 7/20 |

FOREIGN PATENT DOCUMENTS

| | | |
|---|---|---|
| CN | 112736890 A | 4/2021 |
| DE | 102006057249 A1 | 6/2008 |
| DE | 102018221201 A1 | 6/2020 |
| DE | 102019219388 A1 | 6/2021 |
| DE | 102021203450 A1 | 7/2021 |
| WO | 2016045837 A1 | 3/2016 |

* cited by examiner

*Primary Examiner* — Stephen W Jackson
(74) *Attorney, Agent, or Firm* — Tarolli, Sundheim, Covell & Tummino LLP

(57) ABSTRACT

An electric device (1) for a motor vehicle, including a protective device (2) and at least two connection elements (5, 6), that connect at least two voltage sources (3, 4) to at least two loads (7, 8), the protective device (2) including a combination of a short-circuit protection device (10) and an electric bridge (9), the electric bridge (9) interconnecting the at least two connection elements (5, 6).

20 Claims, 1 Drawing Sheet

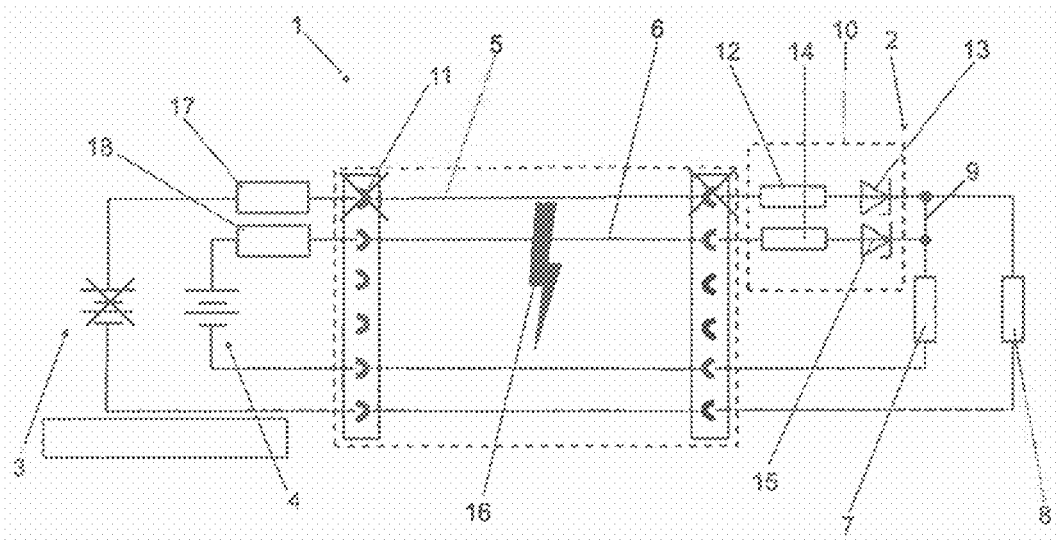

ELECTRIC DEVICE FOR A MOTOR VEHICLE

RELATED APPLICATIONS

This application corresponds to PCT/EP2022/073693, filed Aug. 25, 2022, which claims the benefit of German Application No. 10 2021 209 436.8, filed Aug. 27, 2021, the subject matter of which are incorporated herein by reference in their entirety.

The invention relates to an electric device for a motor vehicle, comprising a protective device and at least two connection elements which connect at least two voltage sources to at least two loads.

Electric devices for motor vehicles are generally known from the prior art in order to supply electric loads, for example sensors, with electric energy. Protective devices are usually used which are intended to maintain the operability of the electric device in the event of a defect in the electric device or one of its components. For example, it is known to provide multiple voltage sources in an electric device for the purpose of redundancy in order to supply at least two loads with fail-safe electric energy. If a short-circuit occurs in a redundant circuit, the operability of the electric device can be maintained by means of an appropriate short-circuit protection device by allowing the affected circuit to be supplied by the additional voltage source.

The protective devices described are usually set up to intercept a first defect of a specific type of fault in the electric device or to ensure the operability of the electric device when the first defect occurs. However, if a further or different type of defect occurs, the electric device usually loses at least some of its operability because the protective device is not designed for a different type of fault. For example, if two different types of faults occur, for example a short-circuit or a missing contact or a line interruption, conventional protective devices are not designed to compensate for both faults. The protective devices are usually only aimed at a specific fault or type of fault. In other words, although a protective device is provided to prevent short-circuits, the electric device will lose its operability if a different type of fault, for example a line interruption, occurs.

The invention is based on the object of specifying an improved electric device for a motor vehicle.

This object is achieved by an electric device having the features of claim 1. Advantageous embodiments are the subject of the dependent claims.

As described, the invention relates to an electric device for a motor vehicle, which comprises a protective device. The electric device further comprises at least two connection elements which are associated with two voltage sources in order to connect the two voltage sources to at least two loads. The invention is based on the knowledge that the protective device comprises a combination of a short-circuit protection device and an electric bridge, which electric bridge connects the at least two connection elements to one another.

In principle, the invention therefore concerns a protective device for an electric device or a "protective circuit". The protective device can also be understood as a separate module that can be connected to the electric device, for example in a plug-in or modular manner. The protective device of the electric device ensures a high safety standard or low fault failure rates or fault tolerance, since the protective device enables a further level of redundancy with which not only one type of fault, but at least two different types of faults in a circuit of the electric device can be prevented. The electric device described can in particular relate to an electric device in a safety-relevant system of the motor vehicle, for example a steering system or one of its sub-components, for example a sensor system.

If a fault occurs that is assigned to a first type of fault or a second type of fault, the protective device can still maintain the operation of the electric device. For example, the fault may be a short-circuit or a line interruption or open circuit, wherein the protective device still maintains the operation of the electric device. For example, individual contact points of the electric device may be corroded, for example due to water ingress, and the electric device may leak or be operated under water. Because the protective device has both a short-circuit protection device and an electric bridge, both types of faults described can be dealt with.

The combination of the electric bridge and the short-circuit protection device in the protective device ensures that both line interruptions and short-circuits can be dealt with by the protective device. Furthermore, a different type of fault does not cause two voltage circuits or current circuits to become defective. For example, if an isolated electric bridge is considered that is operated independently of another short-circuit protection device, a short-circuit in one of the connection elements connected to one another by the two electric bridges leads to both circuits being short-circuited. The combination of the short-circuit protection device with an electric bridge prevents a short-circuit in one of the two connection elements from leading to a complete failure. Instead, the protective device can ensure continued operation of the electric device, since the operation of the electric loads is maintained by the circuit that is not directly affected by the short-circuit.

In a first embodiment, the short-circuit protection device can have at least two protective elements that are associated with the at least two connection elements. The protective elements can ultimately be designed or chosen as desired. By assigning a protective element to each of the connection elements, each of the connection elements can be protected separately.

The short-circuit protection device can also have at least two protection elements for each connection element. For example, a defined combination of protective elements can be associated with each of the connection elements or the short-circuit protection device can be designed in such a way that a defined combination of protective elements is provided for each of the connection elements. The protective elements can in particular be designed differently from one another, so that, for example, two or more different protective elements are combined with one another in order to form a component or a module of the short-circuit protection device for the corresponding connection element.

For example, protective resistances and/or protective diodes, in particular Zener diodes, and/or FETs and/or MOSFETs can be used as protective elements. As described above, any combination of two or more such protective elements can be formed for the short-circuit protection device for each of the connection elements. It is therefore possible that different protective elements can be used and these can also be combined with one another in any way, wherein the diversity of protective elements and their combinations is advantageous for an ASIL consideration. Depending on which protective elements of combinations are provided, various electric faults or defects in the electric device can be dealt with by the short-circuit protection device. For example, a first combination of protective elements can be associated with a first supply line and a second combination of protective elements can be associated with a second supply line. The first and second combinations can be the same or different. Likewise, any other supply lines can have any other similar or different combinations of protective elements. Depending on the electric load, for example depending on the type of sensors and the like, it is possible to select which combination of protective elements is more appropriate for the intended purpose. The short-circuit protection device and thus the overall protective device of the electric device can thus be adapted to the application.

At least one of the at least two voltage sources can have an additional short-circuit protection device. The short-circuit protection device, which may also be referred to as a "short-circuit protection", can therefore also be integrated into the voltage source, for example as a semiconductor module, or the voltage source used or the at least two voltage sources used may additionally have such a short-circuit protection device. An additional short-circuit protection device is understood to be a short-circuit protection device that is present for the corresponding circuit in addition to the short-circuit protection device integrated in the protective device. Advantageously, the voltage source itself and also the rest of the circuit, for example the connection elements, for example in a plug, can be protected against a short-circuit.

As described, the electric device can be used to supply at least two electric loads with electric energy. At least one load can be designed as a torque sensor or angle sensor, in particular for an electric machine, or can comprise one of these. In principle, the type and number of electric loads that are assigned to the electric device and are supplied with electric energy by it can be freely selected or adapted to the intended use. Among other things, the electric loads can be sensors, in particular torque sensors or angle sensors. Other types of sensors can also be used.

At least one of the at least two loads can have at least two electric channels and/or at least two loads with different channels can be connected to the same voltage source. In the context of this application, the term "channel" is understood as a general term for a connection of a voltage source via its supply line to at least one load. The term "channel" therefore refers to an electric connection or supply line and not to a data line. According to this embodiment, the sensors or at least one sensor can have several channels, wherein the individual channels can share a common voltage source. For example, a first load, in particular a first sensor, can have a first and a second channel, wherein a second load, in particular a second sensor, can have a third and a fourth channel, wherein the two sensors can share one voltage source or two voltage sources of the electric device as desired.

According to a further embodiment, the protective device can be arranged in the area of the load, in particular within a housing or a connection of the load or in a connection element or in a plug. The protective device described can thus be arranged as close as possible to the load, so that the connection elements can be protected by the protective device over their entire length or the most part of their length, in particular from the voltage source to the load. Faults occurring in the connection elements can be intercepted particularly advantageously. In principle, the location of the protective device can be chosen arbitrarily. As a protective device close to the load, for example, arrangement options close to the load or sensors can be considered, for example an integration of the protective device directly into the load or on the load or a connection element, in particular a plug. The fact that an arrangement of the protective device in the immediate vicinity of the load is advantageously chosen means that a fault that occurs before the protective device can be intercepted by it.

As part of this application, a distinction can be made between single faults and multiple faults as well as the type of fault (short-circuits and line interruptions). For example, in a two-load system, a short-circuit/line interruption in a first channel and a short-circuit/line interruption in a second channel would bring the entire system to a standstill. Only with a three-load system would the redundant supply be guaranteed, since the third channel can guarantee the supply of the loads with above fault types in the other two channels. In a proposed two-load system as an example, only the type of fault is covered, but not the number thereof (only single faults). The number of maskable faults A is $A=n-1$. Wherein n indicates the number of channels. The number of maskable faults (short-circuit and line interruption) increases with the number of redundant channels or supply lines.

The electric device can further be developed in such a way that the electric device has at least three connection elements which connect at least three voltage sources to at least three loads, wherein the protective device comprises a combination of a short-circuit protection device and an electric bridge, which electric bridge connects the at least three connection elements to one another. With regard to the previously or fundamentally described electric device, and in particular its protective device, according to this embodiment, the protective device can also be expanded to at least three connection elements or ultimately any number of connection elements. For this purpose, the electric bridge is expanded by one connection so that the electric bridge can always connect all connection elements with one another. In principle, another voltage source can also be added and a short-circuit protection device for each segment of the electric bridge or for each connection element. In other words, each connection element can always be assigned a short-circuit protection device and a segment of the electric bridge that connects the connection element to the respective further connection elements. The proposed redundancy can therefore be expanded as desired and can cover any higher redundancies with, for example, "n-number of connection elements".

In addition, the invention relates to a motor vehicle, comprising a described electric device. All advantages, details and features described in relation to the electric device are completely transferable to the motor vehicle.

The invention is described in the following using an exemplary embodiment with reference to the FIGURE. The FIGURE is a schematic representation and shows an electric device 1 for a motor vehicle, not shown in detail.

The electric device 1 has a protective device 2, which is designed to protect the electric device 1, in particular to deal with faults in the electric device 1, for example short-circuits and line interruptions, and to maintain the operation of the electric device 1 in the event of such a fault. The protective device 2 can be understood as a separate module. The protective device 2 can, for example, be integrated into a plug or into a connection element, for example into a cable, of the electric device 1. The protective device 2 can be arranged particularly advantageously close to a load 7, 8.

The electric device 1 has, for example, two voltage sources 3, 4, which are connected to two loads 7, 8 by means of two connection elements 5, 6. The loads 7, 8 can basically be selected as desired and in this exemplary embodiment are only illustratively designed as sensors, in particular torque and angle sensors, for an electric machine of the motor vehicle. The connection elements 6, 6 can also be referred to as supply lines or the entire connections between the voltage sources 3, 4 to the loads can be referred to as "channels".

The protective device 2 has an electric bridge 9 and a short-circuit protection device 10. The electric bridge 9 and the short-circuit protection device 10 thus represent components of the protective device 2. The electric bridge 9 is designed to connect the two connection elements 5, 6 to one another, so that in the event of a line interruption in one of the connection elements 5, 6, supply to both loads 7, 8 is still guaranteed. As an example, a line interruption is shown with reference number 11 in the connection element 5. Due to the electric bridge 9, the electric device 1 is still kept operational, since both loads 7, 8 can be supplied via the voltage source 4.

The short-circuit protection device 10 assigned to the loads 7, 8 has several protective elements, which can basically be chosen arbitrarily. The following description can therefore be adapted or modified as desired with regard to the number, type and combination of the various protective elements. As protective elements, among other things, protective resistances, protective diodes, FETs, MOSFETs and the like can also be used in any combination. Special terms are used below for various protective elements, wherein a resistance used as a protective element is referred to as a protective resistance or a diode used as a protective element as a protective diode. The individual protective elements can be expanded, combined or replaced as desired by individual, protective elements or combinations of protective elements of different types.

As shown, two protective elements can, for example, be assigned to the same connection element 5, 6. In the exemplary embodiment shown, the connecting element 5 is assigned a first protective resistance 12 and a first protective diode 13, in particular a Zener diode, and the second connecting element 6 is assigned a second protective resistance 14 and a second protective diode 15, in particular a Zener diode, which can prevent short-circuits in the corresponding connecting elements 5, 6.

A situation is shown as an example in which there is a short-circuit 16 in the connection element 6. Accordingly, in the exemplary embodiment shown, the supply of the two electric loads 7, 8 with electric energy can be ensured by the second voltage source 4, although the first voltage source 3 is not available due to the short-circuit 16. The situation shown is only to be understood as an example. It is also possible that the line interruption 11 or the short-circuit 16 occurs in other elements, for example in the connection element 6. The individual fault states can also occur in isolation.

The FIGURE also shows that the voltage sources 3, 4 are each assigned an additional short-circuit protection device 17, 18, which protect the voltage sources 3, 4 separately from a short-circuit.

REFERENCE NUMERALS

1 electric device
2 protective device
3, 4 voltage source
5,6 connection element
7,8 load
9 bridge
10 short-circuit protection device
11 line interruption
12 protection resistance

13 protection diode
14 protection resistance
15 diode
16 short-circuit
17, 18 short-circuit protection device

The invention claimed is:

1. An electric device (1) for a motor vehicle, comprising a protective device (2), at least two voltage sources, at least two loads, and at least two connection elements (5, 6), each connection element connecting one of the at least two voltage sources to one of the at least two loads, wherein the protective device (2) comprises a short-circuit protection device (10) and an electric bridge (9), which electric bridge (9) connects the at least two connection elements (5, 6) to one another at all times.

2. The electric device (1) according to claim 1, wherein the short-circuit protection device (10) has at least two protective elements which are assigned to the at least two connection elements (5, 6).

3. The electric device (1) according to claim 2, wherein the short-circuit protection device (10) has at least two protection elements for each connection element (5, 6).

4. The electric device (1) according to claim 2, wherein the at least two protective elements are designed as a protective resistance (12, 14) and/or as a protective diode (13, 15), in particular as a Zener diode, and/or as a FET and/or as MOSFET.

5. The electric device (1) according to claim 1, wherein at least one voltage source (3, 4) has an additional short-circuit protection device (17, 18).

6. The electric device (1) according claim 1, wherein at least one load (7, 8) is designed as a torque sensor or angle sensor, in particular for an electric machine, or includes one of these.

7. The electric device (1) according to claim 1, wherein the load (7, 8) has at least two electric channels and/or at least two loads (7, 8) are connected to different channels of the same voltage source (3, 4).

8. The electric device (1) according to claim 1, wherein the protective device (2) is arranged in the area of the load (7, 8), in particular within a housing or a connection of the load (7, 8) or in a connection element or in a plug.

9. The electric device (1) according to claim 1, wherein the electric device (1) has at least three connection elements (5, 6) which connect at least three voltage sources (3, 4) to at least three loads (7, 8), wherein the protective device (2) comprises a combination of a short-circuit protection device (10) and an electric bridge (9), which electric bridge (9) connects the at least three connection elements (5, 6) to one another.

10. A motor vehicle, comprising an electric device (1) according claim 1.

11. The electric device according to claim 1, wherein the electric bridge connects one of the at least two voltage sources to the at least two loads when one of the at least two connection elements has an interruption and connects another of the at least two voltage sources to the at least two loads when another of the at least two connection elements has an interruption.

12. The electric device according to claim 1, wherein the electric bridge is free of a switch.

13. The electric device according to claim 1, wherein the short-circuit protection device permits a supply of electric energy to the at least two loads by one of the at least two voltage sources when another of the at least two voltage sources is unavailable due to a short-circuit.

14. An electric device for a motor vehicle, comprising:

first and second voltage sources;

first and second loads;

a first connection element connected to the first voltage source;

a second connection element connected to the second voltage source; and a protective device connecting the first and second connection elements to the first and second loads, the protective device having a short-circuit protection device and an electric bridge, the short-circuit protection device permitting a supply of electric energy to the first and second loads by the first voltage source when the second voltage source is unavailable due to a short-circuit, the electric bridge connecting the first and second connection elements to each other, the electric bridge connecting the first voltage source to the first and second loads when the second connection element has an interruption and the electric bridge connecting the second voltage source to the first and second loads when the first connection element has an interruption.

15. The electric device according to claim 14, wherein the short-circuit protection device includes a first protective element and a second protective element, the first protective element being assigned to the first connection element and the second protection element being assigned to the second connection element.

16. The electric device according to claim 15 wherein the short-circuit protection device includes a third protection element assigned to the first connection element and a fourth protection element assigned to the second connection element.

17. The electric device according to claim 14, wherein the first voltage source has an additional short-circuit protection device spaced from the short-circuit protection device of the protective device.

18. The electric device according claim 14, wherein the first load is one of a torque sensor and an angle sensor.

19. The electric device according to claim 14, wherein the protective device is arranged in the area of at least one of the first and seconds loads.

20. The electric device according to claim 19, wherein the protective device is arranged in one of a housing and a plug.

* * * * *